April 12, 1949.    R. BRUNKEN    2,467,077
DRIVING MECHANISM FOR ENGINE ACCESSORIES
Filed Oct. 13, 1943    4 Sheets-Sheet 1

INVENTOR.
RENKE BRUNKEN
BY
ATTORNEYS

April 12, 1949. R. BRUNKEN 2,467,077
DRIVING MECHANISM FOR ENGINE ACCESSORIES
Filed Oct. 13, 1943 4 Sheets-Sheet 3

April 12, 1949.  R. BRUNKEN  2,467,077
DRIVING MECHANISM FOR ENGINE ACCESSORIES
Filed Oct. 13, 1943  4 Sheets-Sheet 4

INVENTOR.
RENKE BRUNKEN
BY *Richey & Watts*
ATTORNEYS

Patented Apr. 12, 1949

2,467,077

UNITED STATES PATENT OFFICE 2,467,077

DRIVING MECHANISM FOR ENGINE ACCESSORIES

Renke Brunken, Shaker Heights, Ohio, assignor to The White Motor Company, Cleveland, Ohio, a corporation of Ohio Application October 13, 1943, Serial No. 506,049

26 Claims. (Cl. 123—119)

This invention relates broadly to motor vehicles of the type that embody as a driving medium, a hydraulic coupling or torque converter, and more specifically to mechanism coordinated with the transmission to control the operation of the engine accessories or other instrumentalities driven by the engine.

One of the objects of the invention is to utilize the speed characteristics of the driving and driven elements of a hydraulic transmission to control the operation of the engine.

Another object of the invention is to improve the over-all economy and performance of a vehicle by regulating the speed of the mechanisms essential to the operation of the engine and control of the vehicle.

A further object of the invention is to provide mechanism for driving an engine accessory at its most efficient rate of speed throughout the entire speed range of the vehicle and the periods in which the engine is idling while the vehicle is at rest.

In detail the invention contemplates a differential gear unit driven conjointly by the engine and the turbine in a torque converter and organized to drive an engine accessory at speeds which are functions of the input and output speeds of the torque converter. When a vehicle equipped with a torque converter is at rest, the turbine therein is likewise at rest. When, however, the vehicle is brought into motion the turbine will rotate at a rate of speed which is proportional to the vehicle speed, the speed difference between the engine and the turbine gradually decreasing as the turbine accelerates. Thus it will be seen that the maximum speed difference between the engine and turbine will be attained during the initial movement of the vehicle and the minimum speed difference will be attained as the vehicle approaches its top speed.

In the present invention advantage is taken of the speed differential between the engine and turbine and the characteristic variation thereof as defined above, the changes in the R. P. M. of the driving and driven members of the transmission being utilized to control such accessories or operative elements of the engine or vehicle as effect the performance thereof.

Other objects and advantages more or less ancillary to the foregoing and the manner in which all the various objects are realized will appear in the following description, which considered in connection with the accompanying drawings, sets forth the preferred embodiment of the invention.

In the drawings, which are chosen herein as merely illustrative of one of the environs within which the invention may be incorporated:

Figure 3:
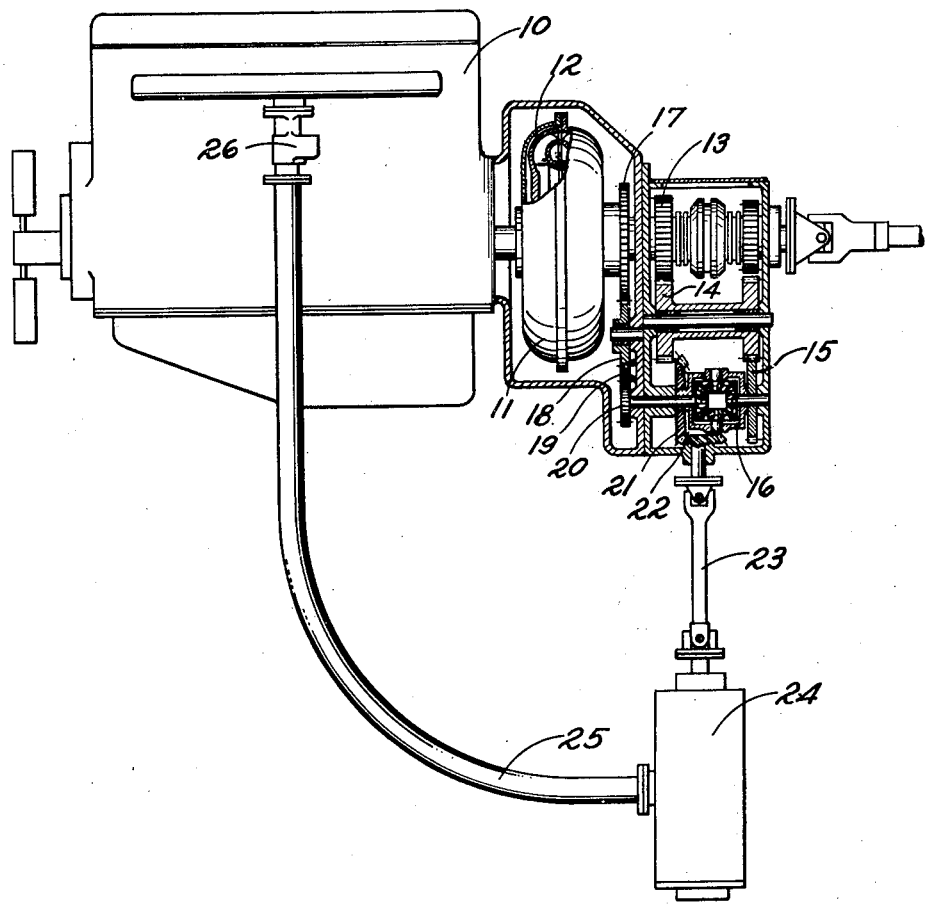
Fig. 3 is a side elevational view of an engine illustrating somewhat diagrammatically the arrangement of the improved accessory driving unit coupled with a torque converter and supercharger.

Referring first to Fig. 3, the engine 10 is coupled with a hydraulic transmission 11 embodying a turbine 12 coupled with a gear train 13, 14 and 15, which in turn is connected with one side of a differential gear unit 16. The other side of the differential gear unit is driven from the engine through a gear train embodying the gear 17, idlers 18 and 19 and the gear 20. The bevel gear 21 of the differential gear unit 16 is connected with a pinion 22 operatively connected with a drive shaft 23 for driving a supercharger 24, coupled in the customary manner through a conduit 25 to the engine carburetor 26.

Figure 4:
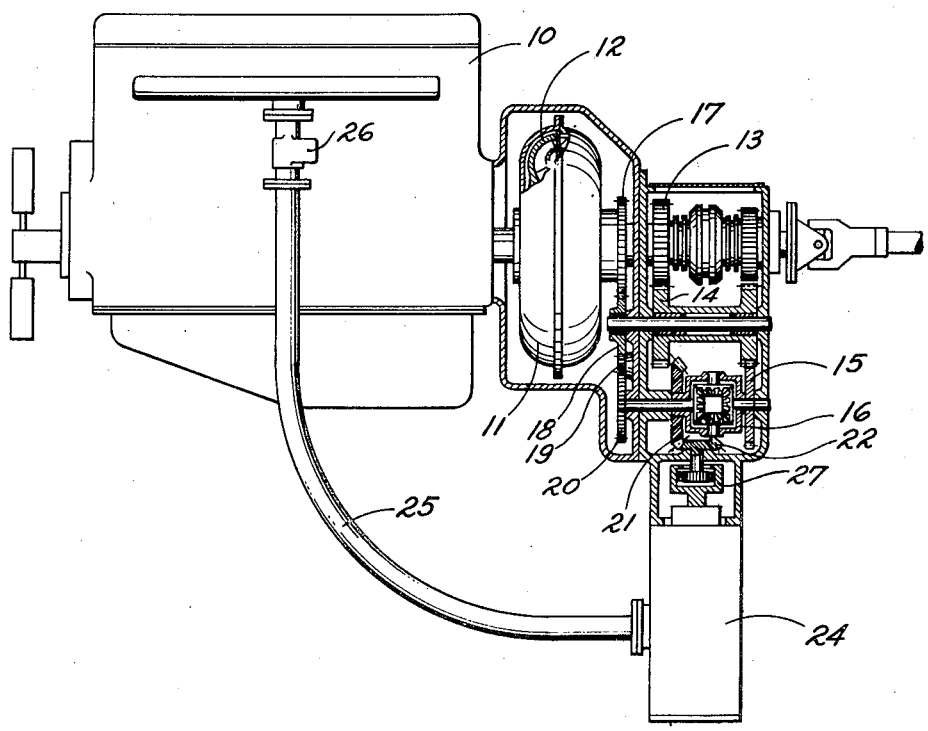
Fig. 4 is a similar view of the engine and supercharger showing the driving unit coupled with a clutch or free wheeling mechanism.

As illustrated in the modified structure shown in Fig. 4, a clutch or free wheeling unit 27 is interposed between the supercharger and differential gear unit, such mechanism being provided to permit the supercharger to be driven by the natural aspiration of the engine in certain installations where the output speed of the differential is too low to effect the delivery of the requisite volume of air to the carburetor.

Figure 5:
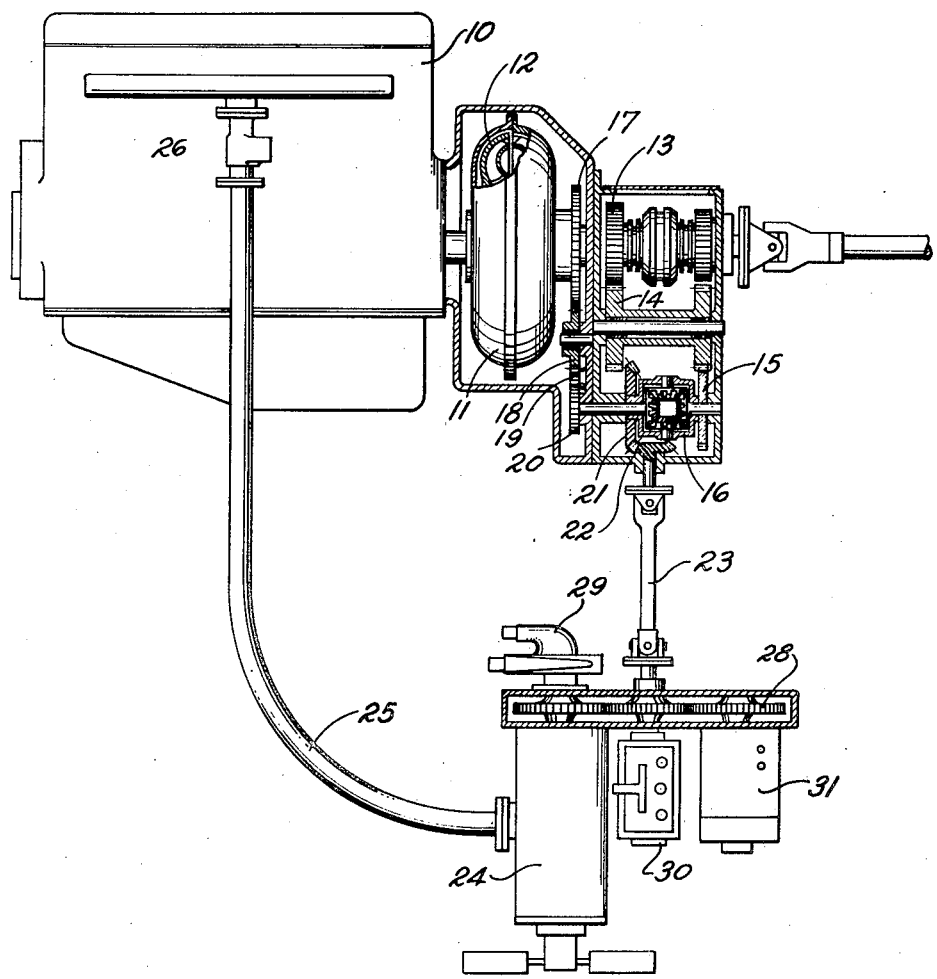
Fig. 5 is a similar view of the engine and torque converter showing the driving unit coupled with a supercharger, generator, water pump, air compressor and fan.

As illustrated in Fig. 5, the gear 21 of the differential gear unit 16 is coupled with a gear train 28 operatively connected to the supercharger 24, a water pump 29, an air compressor 30 and a generator 31, such organization providing a variable speed drive for actuating the engine accessories at their requisite rates of speed. Obviously other instruments coordinated with the engine and/or vehicle for the control or operation thereof may be intergeared with the differential gear unit and it will be understood that such instruments or accessories though not shown or specifically described herein are deemed as falling within the scope and spirit of the present invention.

Figure 1:
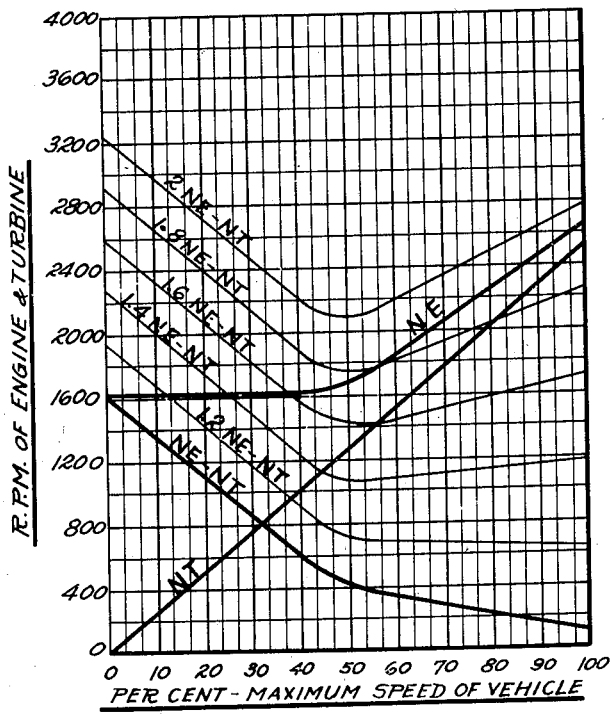
Fig. 1 is a graph showing typical engine and turbine speeds plotted against the vehicle speed.
Figure 2:
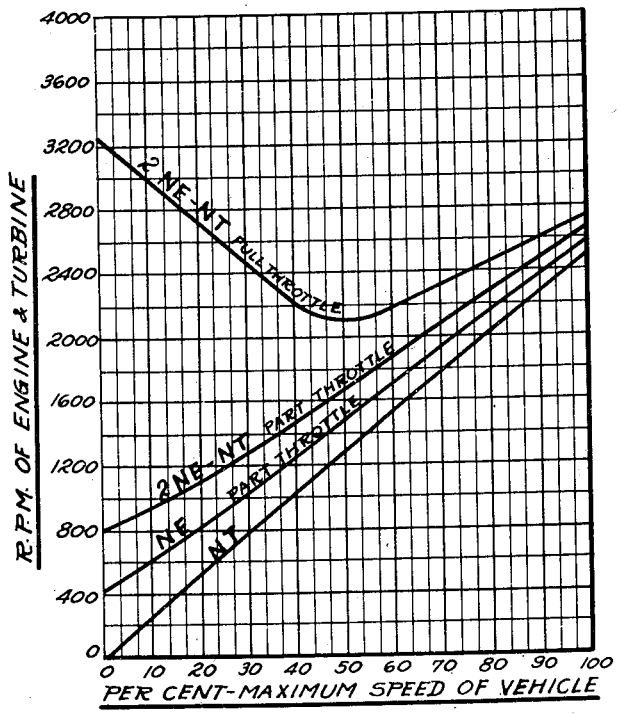
Fig. 2 is a similar graph showing part throttle conditions.

Referring now to the chart or graph shown in Fig. 1, the engine speed is indicated by the curve NE, the turbine speed by the curve NT, the speed difference between these two curves being shown by the curve NE—NT, all of said curves being plotted for full throttle operation. By comparison of the curves it will be seen that the speed difference between the engine and turbine is at its maximum value when the vehicle is at rest and gradually decreases as the vehicle reaches its maximum speed. More specifically when the vehicle is at rest, the engine R. P. M. is 1620 (curve NE—NT), whereas at vehicle top speed the engine R. P. M. is 2660 (curve NE); the turbine R. P. M. in such case being 2550 (curve NT), or a speed difference of 110 R. P. M. It will be readily recognized that modification of the speed characteristics may be obtained by changing the input speed to the differential gear unit from either the engine or turbine or, considered from the standpoint of the driven element, the accessory speed is a function of the speed of the engine and the speed of the turbine or secondary element of the hydraulic transmission. For example, as shown in the curve 2 NE—NT and also in Fig. 3, the engine speed is doubled through the gearing 17 and 20 for driving the left side of the differential gear unit 16 while the right side of the differential is driven at a ratio of one to one through the gears 13, 14 and 15 from the turbine. Obviously, similar differential speed characteristics may be developed by reducing the input speed from the turbine to the differential relative to the engine speed. The curves 1.2 NE—NT, 1.4 NE—NT, 1.6 NE—NT, 1.8 NE—NT and 2 NE—NT shown in Fig. 1, wherein the factors preceding the term NE indicate the speed ratio between the engine and differential gear unit, are illustrative of some of the speed characteristics that may be employed to accommodate the requisite operation of various engine accessories.

Comparing the curve 2 NE—NT with the curve NE—NT it will be seen that the drop in the differential speed of the former is less than that of the latter, hence it follows that when the input speed from the engine to the differential gear unit is multiplied, other elements of the equipment remaining constant, a distinctly different differential speed characteristic may be obtained which will more closely meet the requirements peculiar to the different accessories driven by the differential gear unit.

Heretofore it has been the practice to drive the engine accessories in a motor vehicle at a speed directly proportional to the R. P. M. of the engine or at some fixed predetermined ratio. In the present invention the accessories are driven at infinitely variable speeds made possible through the differential gear unit and the requisite gear ratio therefor. For example, in a vehicle or similar piece of equipment where the engine is idled a large percent of the time and where the generator is driven at a speed directly proportional to the R. P. M. of the engine in order to maintain the charging rate undue strains and excessive wear are imposed upon the generator and driving parts therefor when the engine attains its maximum R. P. M. If, however, the generator were operated by the mechanism contemplated herein the idling speed of the engine could be relatively slow while the generator speed would be sufficient to charge the battery and conversely at engine full throttle the maximum generator speed would never reach the point which would produce any deleterious effects upon the generator bearings or driving connections coupled therewith.

Another application of the present invention resides in the combination of the improved drive with a fan. Although it has been the general practice to operate the fan in direct proportion to the engine speed it is apparent that greater efficiency could be obtained if the fan were operated at top speed when maximum torque loads were imposed upon the engine. By using the differential gear unit embodying the present invention the fan may be driven at a speed which will effect requisite cooling of the engine relative to the load imposed thereon irrespective the speed of the vehicle. When a vehicle is brought to rest and the engine left idling after a relatively long period of operation at full throttle the increased fan speed as attained by the differential gear unit will prevent the engine from overheating since, as pointed out above, the speed of the driven accessory is greatly increased when the vehicle is standing still. When the vehicle is driven at part throttle opening the turbine speed will gradually approach the speed of the engine, the decreased speed difference between the engine and turbine causing proportional deceleration of the accessory. Since the power consumption of the fan increases in proportion to the third power of its speed it will be seen that an appreciable conservation of energy and economy of fuel can be obtained when the improved differential gear unit is employed in this environment.

The water pump may also be driven more effectively under certain operating conditions when the proper gear ratio for the accessory is employed.

The same and further advantages reside in utilizing the differential gear unit as the driving mechanism for an air compressor for operating the air brakes, a door operating device and similar mechanisms in a motor vehicle. In such combination the air compressor may be driven at a higher rate of speed than the engine when the vehicle is at rest, hence the storage tanks for the brakes or other mechanisms may be sufficiently replenished during the period in which the vehicle is at rest to accommodate emergency stops when the vehicle is again brought into motion. Since the differential gear unit effectuates a relatively high driving rate of speed during the periods in which the vehicle is at rest and subsequent the brake application therefor it follows that a smaller compressor could be used without sacrifice to the efficiency of operation of the vehicle.

The utility of the present invention is more apparent when the improved differential gear unit is employed to drive a supercharger for an internal combustion engine. In this combination, as pointed out above, the driven element in the hydraulic transmission will reach its maximum R. P. M. at or near the engine stalling speed. Thus in an engine developing $T_e$ foot pounds, a supercharger effectuating a 35% power increase and a torque converter having a torque multiplication of 3 to 1, the power gain would equal 1.35 Te, the engine torque delivered to the torque converter, times the torque converter rate (3×1.35 Te) or a total output of 4.05 Te. It will be noted that this increase of power is available at the time it is desired to start the vehicle from rest and that the gain in power is sufficient to warrant the use of a smaller engine and/or eliminate the use of change speed gearing.

Referring once more to the graph in Fig. 1, it will be seen that variations of speed may be obtained by changing the gear ratio for the differential gear unit. Thus in designing the drive for a supercharger it is apparent that a gear selection may be made which will effectuate an engine power output consonate with the type of work and/or power demands contemplated for the engine.

When the engine is operated at part throttle the supercharger will turn over at a relatively low rate of speed and hence consume less power than required for full throttle operation. Obviously, when the supercharger is rotated slowly it will deliver less air to the engine and thus effectuate proportional economies in the fuel consumption of the engine.

From the foregoing it will be readily recognized that the improved differential gear unit will afford an appreciable economy in fuel consumption, a further economy in the initial cost of the equipment, improvements in the operation of the accessories and improvements in the overall performance of the vehicle.

It will be understood that the improved driving unit may be used with equal facility in other environs than the automotive vehicle described above, that one or more of the advantages and utilities defined above reside in the combination of the invention in or with other machines and that such combination is contemplated herein as falling within the spirit and scope of the invention and accompanying claims.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. In a motor vehicle, an engine, a hydraulic transmission coupled therewith, a secondary element in said transmission, a supercharger connected with said engine, mechanism for driving said supercharger comprising gearing coupled with said engine and the secondary element in said transmission and driven thereby, and a shaft coupled with said supercharger and driven by said gearing at a speed which is a function of the speed of the engine and secondary element of said transmission.

2. In a vehicle, a prime mover, a transmission having a driving side and a driven side, and of a type characterized by a speed difference between the two sides responsive to the torque transmitted, a power-consuming auxiliary device, a power shaft for driving the device, and a differential gear operatively connected to the driving side, the driven side and the power shaft so that the power shaft is continuously rotated at a speed proportional to the difference between a multiple of the speed of the driving side and the speed of the driven side.

3. In a vehicle, a prime mover, a hydraulic transmission having a driving side and a driven side, a power-consuming auxiliary device, a power shaft for driving the device, and a differential gear operatively connected to the driving side, the driven side, and the power shaft so that the power shaft is continuously rotated at a speed proportional to the difference between a multiple of the speed of the driving side and the speed of the driven side.

4. In a vehicle, a prime mover, a hydraulic transmission having a driving side and a driven side, a supercharging device for the engine, a power shaft for driving the device and a differential gear operatively connected to the driving side, the driven side, and the power shaft so that the power shaft is rotated at a speed proportional to the difference between a multiple of the speed of the driving side and the speed of the driven side.

5. In a vehicle, a prime mover, a transmission having a driving side and a driven side, and of a type characterized by a speed difference between the two sides responsive to the torque transmitted, a power-consuming auxiliary device, a power shaft for driving the device, and a differential gear operatively connected to the driving side, the driven side, and the power shaft so that the power shaft is continuously rotated at a speed proportional to the difference between a multiple greater than unity of the speed of the driving side and the speed of the driven side.

6. In a vehicle, a prime mover, a transmission having a driving side and a driven side, and of a type characterized by a speed difference between the two sides responsive to the torque transmitted, a power-consuming fluid-moving auxiliary device, a power shaft for driving the device, and a differential gear operatively connected to the driving side, the driven side, and the power shaft so that the power shaft is continuously rotated at a speed proportional to the difference between a multiple of the speed of the driving side and the speed of the driven side.

7. In combination, an engine, a fluid transmission therefor, a supercharger therefor, and drive means for the supercharger comprising a differential gear mechanism having an input from the driving portion of the fluid transmission and an input from the driven portion of the fluid transmission, the said inputs being so coupled that the speed of the supercharger is proportional to the speed difference of the fluid transmission portions.

8. In combination, an engine, a fluid transmission therefor, a power-consuming auxiliary for the engine, and drive means for the auxiliary comprising a differential gear mechanism having an input from the driving portion of the fluid transmission and an input from the driven portion of the fluid transmission, the said inputs being so coupled that the speed of the auxiliary is proportional to the speed difference of the fluid transmission portions.

9. In combination, a prime mover, a first means rotated at a speed proportional to engine speed, a second means rotated at a speed differing from that of the first means by a function of engine torque, differential means for obtaining the difference between the speed of the first means and the speed of the second means, and a supercharger for the prime mover rotated by the differential means.

10. In combination, a prime mover, a first means rotated at a speed proportional to engine speed, a second means rotated at a speed differing from that of the first means by a function of engine torque, differential means for obtaining the difference between a multiple of the speed of the first means and the speed of the second means, and a supercharger for the prime mover rotated by the differential means.

11. In combination, an engine, a fluid transmission therefor, a supercharger therefor, and drive means for the supercharger comprising a differential gear mechanism having an input from the driving portion of the fluid transmission and an input from the driven portion of the fluid transmission, the said inputs being so coupled that the speed of the supercharger is a function of the speed difference of the fluid transmission portions.

12. In combination, an engine, a hydraulic transmission driven by the engine and comprising a driving member and a driven member, a differential mechanism having two rotational inputs and a rotational output proportional to the difference of the inputs, means for driving the differential inputs at speeds proportional to the speeds of the driving and driven members of the transmission, respectively, and an energy-converting engine auxiliary driven by the output of the differential mechanism.

13. In combination, an engine, a hydraulic transmission driven by the engine and comprising a driving member and a driven member, a differential mechanism having two rotational inputs and a rotational output proportional to the difference of the inputs, means for driving the differential inputs at speeds proportional to the speeds of the driving and driven members of the transmission, respectively, and an energy-converting fluid-moving engine auxiliary driven by the output of the differential mechanism.

14. In combination, an engine, a hydraulic transmission driven by the engine and comprising a driving member and a driven member, a differential mechanism having two rotational inputs and a rotational output proportional to the difference of the inputs, means for driving the differential inputs at speeds proportional to the speeds of the driving and driven members of the transmission, respectively, and a supercharger driven by the output of the differential mechanism.

15. A prime mover comprising an engine, a transmission having a driving side and a driven side and characterized by a speed difference between the two sides responsive to the engine torque, an energy-converting auxiliary device for the engine, a power shaft for driving the device, and a differential gear operatively connected to the driving side, the driven side, and the power shaft so that the power shaft is continuously rotated at a speed proportional to the difference between a multiple of the speed of the driving side and the speed of the driven side.

16. A prime mover comprising an engine, a hydraulic transmission having a driving side and a driven side and characterized by a speed difference between the two sides responsive to the engine torque, an energy-converting auxiliary device for the engine, a power shaft for driving the device, and a differential gear operatively connected to the driving side, the driven side, and the power shaft so that the power shaft is continuously rotated at a speed proportional to the difference between a multiple of the speed of the driving side and the speed of the driven side.

17. A prime mover comprising an engine, a transmission having a driving side and a driven side and characterized by a speed difference between the two sides determined by the engine torque, a power-consuming auxiliary device for the engine, a power shaft for driving the device, and a differential gear operatively connected to the driving side, the driven side, and the power shaft so that the power shaft is continuously rotated at a speed proportional to the difference between a multiple greater than unity of the speed of the driving side and the speed of the driven side.

18. A prime mover comprising an engine, a transmission having a driving side and a driven side and characterized by a speed difference between the two sides determined by the engine torque, a power-consuming fluid-moving auxiliary device for the engine, a power shaft for driving the device, and a differential gear operatively connected to the driving side, the driven side, and the power shaft so that the power shaft is continuously rotated at a speed proportional to the difference between a multiple of the speed of the driving side and the speed of the driven side.

19. A prime mover comprising an engine, a transmission having a driving side and a driven side and characterized by a speed difference between the two sides determined by the engine torque, a supercharger for the engine, a power shaft for driving the supercharger, and a differential gear operatively connected to the driving side, the driven side, and the power shaft so that the power shaft is rotated at a speed proportional to the difference between a multiple of the speed of the driving side and the speed of the driven side.

20. The method of driving an energy-converting engine auxiliary for an engine having a hydraulic transmission coupled therewith, comprising driving the auxiliary at a speed proportional to the difference between a multiple of the speed of the engine and the output speed of the hydraulic transmission.

21. The method of driving a fluid-moving engine auxiliary for an engine having a hydraulic transmission coupled therewith, comprising driving the auxiliary at a speed proportional to the difference between a multiple of the speed of the engine and the output speed of the hydraulic transmission.

22. The method of driving a supercharger for an engine having a hydraulic transmission coupled therewith, comprising driving the supercharger at a speed proportional to the difference between a multiple of the speed of the engine and the output speed of the hydraulic transmission.

23. The method of driving a supercharger for an engine having a hydraulic transmission coupled therewith, comprising driving the supercharger at a speed proportional to the difference between a multiple greater than unity of the speed of the engine and the output speed of the hydraulic transmission.

24. The method of driving an energy-converting engine auxiliary for an engine having a hydraulic transmission coupled therewith, comprising driving the auxiliary at a speed proportional to the difference between a multiple greater than unity of the speed of the engine and the output speed of the hydraulic transmission.

25. The method of driving a fluid-moving engine auxiliary for an engine having a hydraulic transmission coupled therewith, comprising driving the auxiliary at a speed proportional to the difference between a multiple greater than unity of the speed of the engine and the output speed of the hydraulic transmission.

26. A method of supercharging an engine coupled to a hydraulic transmission comprising varying the supercharging effect in accordance with the difference between a quantity proportional to engine speed and a quantity proportional to the output speed of the hydraulic transmission, whereby increasing supercharge results from increasing torque of the engine.

RENKE BRUNKEN.

REFERENCES CITED

The following references are of record in the file of this patent:

UNITED STATES PATENTS

| Number | Name | Date |
|---|---|---|
| 996,334 | Haskins | June 27, 1911 |
| 1,364,488 | Doble | Jan. 4, 1921 |
| 1,697,897 | Apple | Jan. 8, 1929 |
| 1,703,064 | Griffiths | Feb. 19, 1929 |
| 1,732,405 | Invernizzi | Oct. 22, 1929 |
| 1,752,224 | Apple | Mar. 25, 1930 |
| 1,787,930 | Fletcher | Jan. 6, 1931 |
| 1,868,130 | Bauer et al. | July 19, 1932 |
| 2,005,486 | Wilson | June 18, 1935 |
| 2,024,531 | Lyons | Dec. 17, 1935 |
| 2,070,615 | Plante | Feb. 16, 1937 |
| 2,091,356 | Fawcett | Aug. 31, 1937 |
| 2,149,785 | Neugebauer | Mar. 7, 1939 |

FOREIGN PATENTS

| Number | Country | Date |
|---|---|---|
| 287,595 | Great Britain | Mar. 29, 1928 |
| 446,979 | Great Britain | May 8, 1936 |
| 375,254 | Italy | Sept. 29, 1939 |